United States Patent
Hoium, Jr. et al.

(10) Patent No.: US 6,266,919 B1
(45) Date of Patent: *Jul. 31, 2001

(54) METHOD AND APPARATUS FOR CONTAINING PLANTS

(75) Inventors: Stanley J. Hoium, Jr., Columbia Heights; David J. Schouweiler, Minneapolis, both of MN (US)

(73) Assignee: J. R. Johnson Supply, Inc., Roseville, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,872

(22) Filed: Jan. 20, 1999

(51) Int. Cl.$^7$ ................................................. A01G 9/02
(52) U.S. Cl. ............................................. 47/66.5; 206/510
(58) Field of Search ........................... 47/66.5, 39, 901, 47/86, 87; 206/564, 561, 560, 499, 423; 220/507, 509, 516, 518; 211/126.1, 85.23, 71.01; 248/311.2, 313, 310

(56) References Cited

U.S. PATENT DOCUMENTS

| | | | |
|---|---|---|---|
| D. 417,784 | * 12/1999 | Umiker | D3/311 |
| 3,386,608 | * 6/1968 | Diller | 220/23.6 |
| 3,638,849 | * 2/1972 | Goings | 229/406 |
| 3,724,654 | * 4/1973 | Gerard et al. | 206/459.5 |
| 3,931,694 | * 1/1976 | Krikorian | 47/87 |
| 4,095,720 | * 6/1978 | Delbrouck et al. | 220/519 |
| 4,242,834 | * 1/1981 | Olsen | 47/73 |
| 4,684,013 | * 8/1987 | Jacobs | 206/423 |
| 4,722,440 | * 2/1988 | Johnston | 206/319 |
| 4,753,037 | * 6/1988 | Whitcomb | 47/73 |
| 4,911,300 | * 3/1990 | Colonna | 206/427 |
| 4,962,855 | * 10/1990 | Holmquist | 206/423 |
| 5,105,948 | * 4/1992 | Morris et al. | 206/519 |
| 5,316,173 | * 5/1994 | Emery | 220/556 |
| 5,335,814 | * 8/1994 | Hepp | 220/509 |
| 5,449,071 | * 9/1995 | Levy | 206/569 |
| 5,713,619 | * 2/1998 | DuBois et al. | 294/159 |
| 5,842,572 | * 12/1998 | Apps et al. | 206/503 |
| 5,855,277 | * 1/1999 | Apps et al. | 206/510 |
| 5,964,343 | * 10/1999 | Steiner | 206/203 |
| 6,006,983 | * 12/1999 | Grouwstra | 229/120.14 |
| 6,050,468 | * 4/2000 | Kelley | 224/542 |

* cited by examiner

Primary Examiner—Charles T. Jordan
Assistant Examiner—Francis T. Palo
(74) Attorney, Agent, or Firm—Nawrocki, Rooney & Sivertson, P.A.

(57) ABSTRACT

A flat (40) for containing a plurality of nestable pots (20). Flat (40) includes a like plurality of "cells" (42) each sized and configured to frictionally hold one of the pots (20). Each cell (42) includes a frame (44) and a plurality of "struts" (54), each strut including a top portion (58) and a bottom portion (60). The top and bottom strut portions have different angles, so that only the strut bottom portions, which are angled at approximately the same angle as the sides of the pots (20), actually grip the pot(s); whereas the strut top portions (58) angle away from the pots and do not frictionally grip same. Preferably, the strut bottom portions (60) grip the bottom portion of the lower pot (of a stack of nested pots) in register with the "dead space" (32) between the nested pots. The result is that only the bottom/outer pot (20b) of a stack of nested pots is frictionally held by the struts, and the inner/upper pot(s) (20a) can be readily removed without having to also remove or disturb the lower pot (20b) in the stack.

5 Claims, 9 Drawing Sheets

METHOD AND APPARATUS FOR CONTAINING PLANTS

FIELD OF THE INVENTION

The present invention generally relates to methods and apparatus for containing plants, and more particularly relates to flats for nestable pots and flat/pot planting systems.

BACKGROUND OF THE INVENTION

The nursery, commercial greenhouse and truck farming industries commonly use pots for growing small plants to be sold to home owners, gardeners, etc. Typically, several empty pots are closely arrayed in a shallow tray called a "flat"; the pots are filled with a mixture of soil, fertilizer, etc.; and a seed or seedling is planted in each pot. The flat of pots is then cultivated as a group for the entire grow-in period. If it becomes necessary to move the pots, the entire flat is carried with the pots remaining in their individual pockets or "cells" within the flat.

Since commercial operations go through a large number of pots and flats, they are usually delivered and stored in large stacks. It is thus highly desirable that the pots and even the flats "nest" together; i.e., the pots fit together in a stack to minimize the dead space therebetween, and likewise for the flats, to render the stacks as compact as possible.

In addition to being nestable, it is important for the pots and flat to work together to form an efficient flat/pot containing system. An efficient system can have several advantageous features. For example, a flat/pot system can be designed in such a way that the flat holds the pots snugly together, thereby minimizing gaps between the pots and the leakage of soil, water, etc. therebetween. Also, a flat can, and typically does, permit water to freely drain from the pots. And a well designed flat is usually strong enough to permit an entire array of filled pots to be carried as a group.

A particularly desirable feature of a flat/pot containing system, and one that is the subject of one aspect of the present invention, is for the flat to frictionally grip the sides of the pots. This prevents the pots from falling over or moving about as the flat is being moved, noting that in some cases the flat will not be completely filled with pots so stability cannot be assured by tightly packing the pots within the flat.

While it is desirable for the flat to frictionally grip the pots, this feature can potentially interfere with the filling of the flat's pockets or cells with the pots. That is, if the flat grips the pots too tightly it may be unnecessarily difficult to insert the pots into the flat's pockets or cells. Also, Applicants have found that unless the flat grips the pots just right, the flat can tend to grip not only the bottom/outer pot of a stack of pots, but also one or more of the upper/inner pots. This can delay the cell filling process, which for some commercial operations involves moving a stack of nested pots from cell to cell to populate all of the cells with empty pots. But if more than one pot is frictionally retained within a given cell, the operator has to delay the normal cell filling process to retrieve the surplus pot(s) from that cell; or alternatively continue with the cell filling process in spite of the fact that some of the cells may contain multiple pots. For a commercial operation, either alternative is wasteful and costly. This scenario would apply whether the flat filling operation is done manually or with the assistance of a machine.

The present invention is directed to a flat and a flat/pot system that possess one or more of the desired characteristics set forth above, and address the problems associated with the prior art flats and flat/pot systems.

SUMMARY OF THE INVENTION

The present invention broadly includes a flat including a plurality of interconnected "cells" for holding a like plurality of pots in a generally horizontal orientation. Each cell includes a generally horizontal upper frame; a plurality of struts connected to the frame and extending generally downwardly and inwardly therefrom; and a generally horizontal bottom structure supported by the struts. Each strut includes a strut top portion having a top angle relative to vertical and a strut bottom portion having a bottom angle relative to vertical, and the top angle is larger than the bottom angle. This cell design permits the lower/outer pot of a stack of nested pots to be frictionally held by the strut bottom portions, while at the same time the inner/upper pot(s) is/are not effectively gripped and can be readily removed without at the same time removing or disturbing the lower/outer pot.

In preferred embodiments, the pots have sides that slope at a pot angle relative to vertical; the pot angle is substantially equal to the bottom angle; and the strut bottom portions are arranged within a given cell to generally conform to the shape of the bottom of the pot, whereby the strut bottom portions grip the pot sides.

Also, preferably, the bottom structure of each cell of the flat is constructed like a lattice that can accommodate water drainage and air exchange through holes or slots in the pot bases.

The invention also includes, even more broadly, a flat having a plurality of interconnected cells for holding a like plurality of nestable pots with sloping sides, wherein each cell includes an upper frame and a "side structure" depending from the frame, wherein the side structure comprises a bottom portion that substantially conforms to and frictionally engages the sides of the corresponding pot and a top portion that angles away from the sloping sides of the pot. Preferably, the "side structure" includes a plurality of slender "struts."

Finally, the invention also includes a method for containing a plurality of nestable pots each having sides that are flexible and that slope at a pot angle relative to the vertical, wherein the method includes the steps of selecting a flat having a frame that defines a like plurality of interconnected cells; configuring each of the cells to include a side structure that depends from the flat frame, wherein the side structure includes a pot gripping portion toward the bottom thereof; and locating the pot gripping portion so that it registers with the dead space between a pair of nested pots, whereby the pot gripping portion effectively grips only the lower/outer pot, and does not effectively grip the upper/inner pot in spite of the fact that the sides of the pots are flexible.

BRIEF DESCRIPTIONS OF THE DRAWINGS

The invention will be further described with reference to the Drawings, wherein.

DETAILED DESCRIPTION OF THE INVENTION

Figure 1:
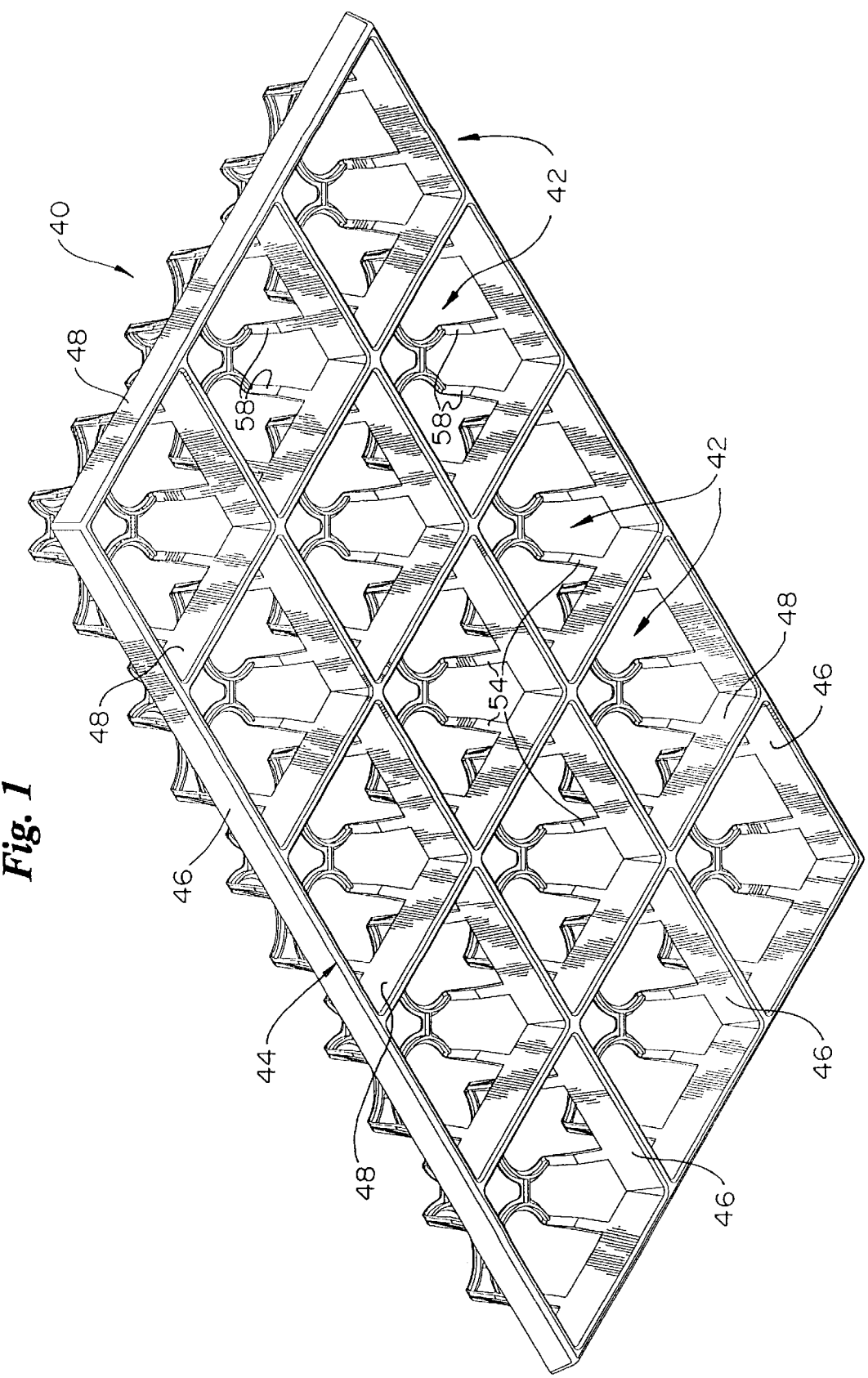
FIG. 1 is a perspective top view of a pot tray according to the present invention.

A preferred embodiment of the present invention will now be described with reference to the Drawings, wherein like reference numerals designate like parts and assemblies throughout the several views.

As noted above, the present invention is related to pots, flats and flat/pot systems. The focus of the invention is, however, a preferred flat structure. That being the case, a fairly typical pot 20 will be briefly described before turning attention to a preferred flat structure suitable for accommodating a plurality of such pots.

Pot 20

A fairly typical pot 20 capable of being accommodated by the flat structure of the present invention is shown in FIGS. 7–10. Pot 20 is preferably a stackable, or rather nestable, injection molded plastic structure, and it is common for a large plurality of such pots to be supplied to the nursery stacked within cartons. The flat structure of the present invention can accommodate a wide variety of pot structures and types, but the preferred flat structure discussed below is indeed optimized for pot 20.

Pot 20 is generally square when viewed from the top or bottom. See FIGS. 9 and 8, respectively. This shape is preferred in that the pots can be closely packed within a flat while eliminating gaps between the pots; and the symmetry of the pot 20 permits flexibility in terms of how the pot 20 is oriented within its "cell" in the flat. Thus there are four generally identical sides 22 of pot 20. The sides 22 terminate at an open upper mouth 24, which is preferably about 4 by 4 inches square. The sides 22 of pot 20 slope downwardly and inwardly and terminate at a closed base 26, which is preferably about 3.25 by 3.25 inches square. As is well known, this general shape (i.e., relatively large mouth, sloping sides, and relatively smaller base) promotes efficient nesting of the pots; thus permitting the pots to be shipped and stored in large stacks with very little dead space between adjoining nested pots.

As noted above, pot 20 has sloping sides. Each side 22 is preferably substantially planar and has a substantially constant angle of about 5° from the vertical. The vertical height of pot 20 is about 3.5 inches. A lip 28 rims the mouth of the pot, with lip 28 extending out approx. ⅛ inch or so from the main wall surface. The wall 22 is thin, about 0.022 inches in thickness, and typically not reinforced or ribbed. This, coupled with the fact that pot 20 is made using a fairly flexible plastic material, e.g., polypropylene, renders walls 22 quite flexible. This means that if a plurality of pots 20 are nested together, squeezing on the wall of the bottom/outer pot can result in squeezing on the wall(s) of one or more of the upper/inner pot(s). The significance of this phenomenon is discussed below.

Figure 7:
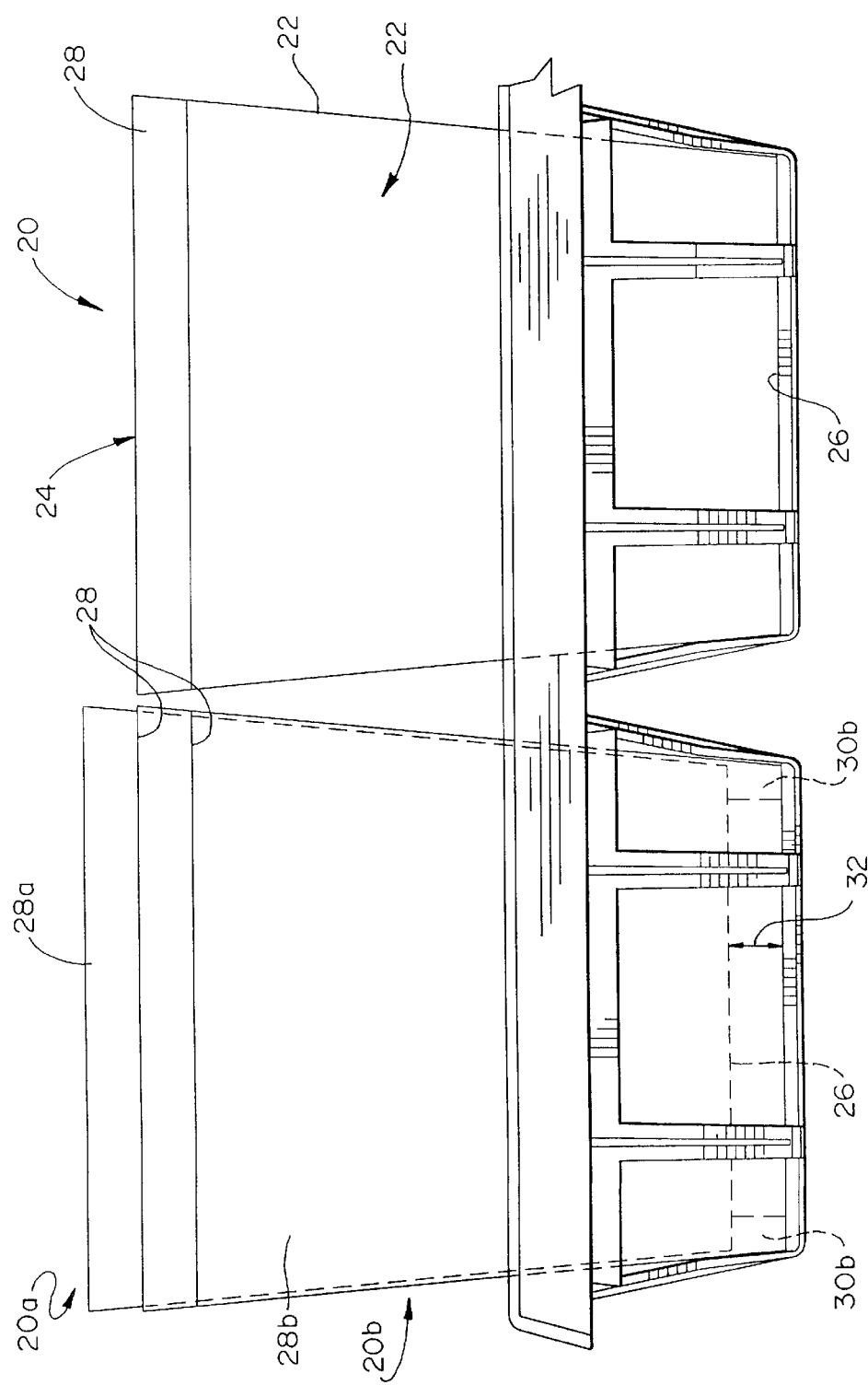
FIG. 7 is an enlarged side elevational view of a pair of adjacent cells of the pot tray of FIG. 1, each holding a pot.
Figure 10:
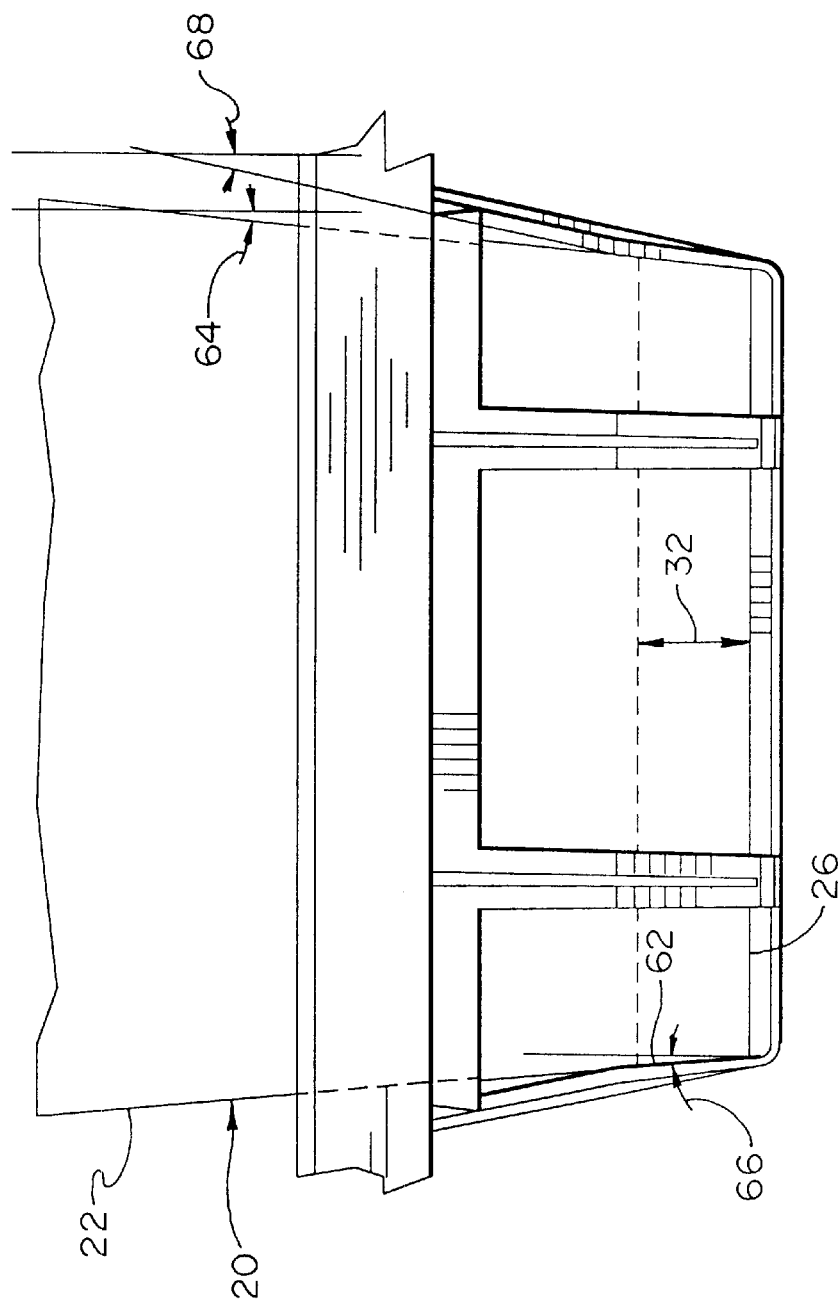
FIG. 10 is a still further enlarged side elevational view of one of the cells of the pot tray of FIG. 1, holding a pot.

Further with regard to how multiple pots 20 would nest together in a stack, reference is particularly made to FIG. 7, the left portion thereof; and FIG. 10. When an upper pot 20a is nested into a lower pot 20b, the lower edge of the lip 28a of the upper pot 20a rests on the upper edge of the lip 28b of the lower pot 20b, with the "a" and "b" qualifiers simply designating the upper and lower pots, respectively. This limits the extent to which the upper pot 20a nests within the bottom pot 20b. Another nesting limit is established by a pair of small rectangular ribs 30 formed in the corner between the base and opposing sides of each pot. There are preferably two such ribs 30 for each pot, located generally opposite one another. With reference to FIG. 7, ribs 30b of the lower/outer pot 20b are sized and configured to engage the underside of the base 26a of the upper/inner pot 20a, to limit the extent to which the pots may nest together. One reason for limiting the degree to which the pots nest is to prevent them from becoming stuck together. That is, it is desirable to have a controlled amount of "dead space" (i.e., open space or distance between the top surface of the lower pot's base and the bottom surface of the upper pot's base) between nested pots, so that they generally do not tend to become overly lodged or jammed together. And, Applicants have further utilized this "dead space" to help prevent nested pots from becoming stuck together when the nested pots are set into a cell or pocket of a preferred flat structure according to the present invention, as further discussed below.

Flat 40

The main focus of the present invention is a highly advantageous flat structure 40, a preferred embodiment of which is shown in the Drawings. Flat 40 is sized and configured to optimally fit pot 20, but those skilled in the art will appreciate that the dimensions, etc. of flat 40 could readily be changed to fit other types and shapes of pots, and still fall within the present invention.

Figure 2:
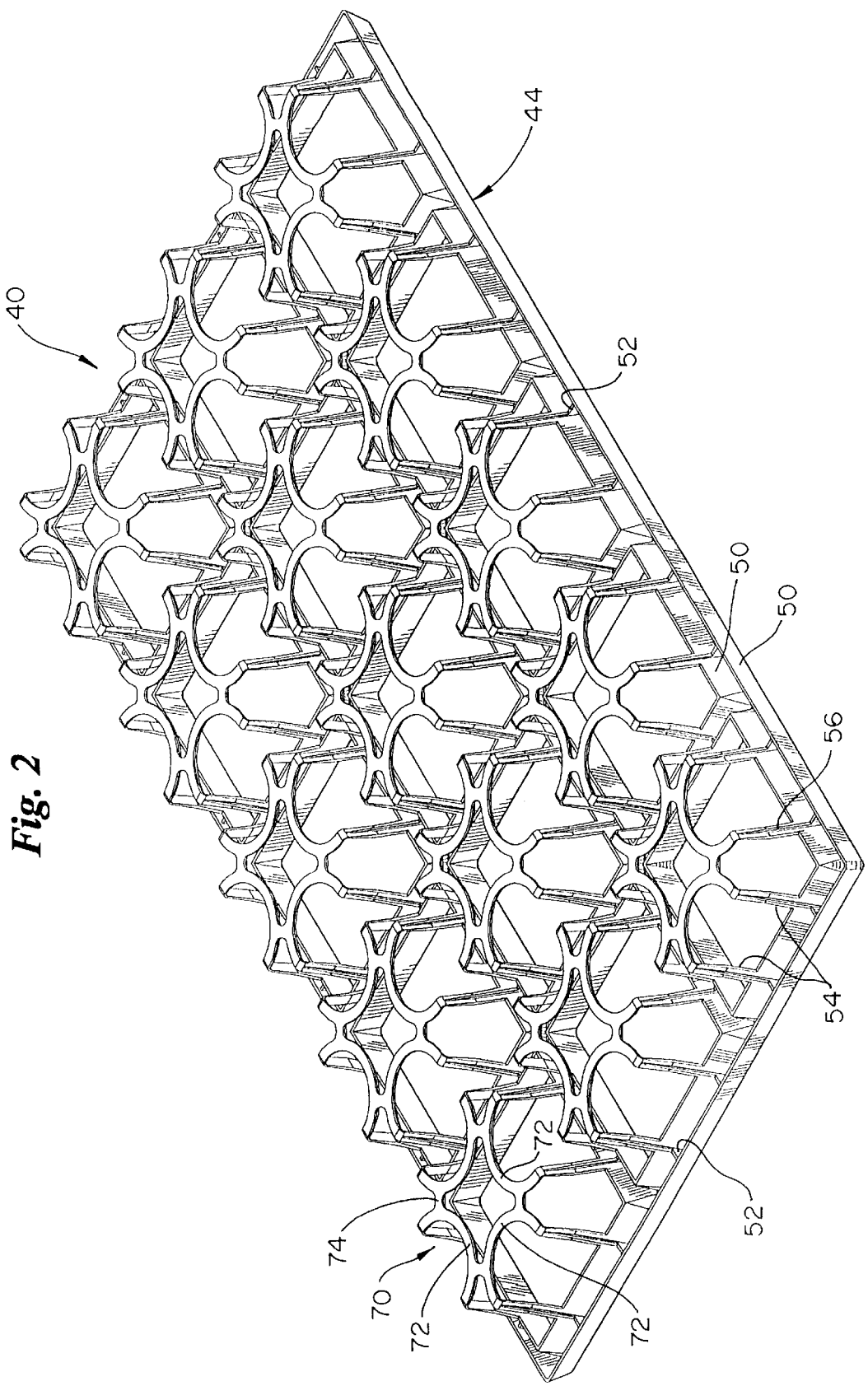
FIG. 2 is a perspective bottom view of the pot tray of FIG. 1.
Figure 3:
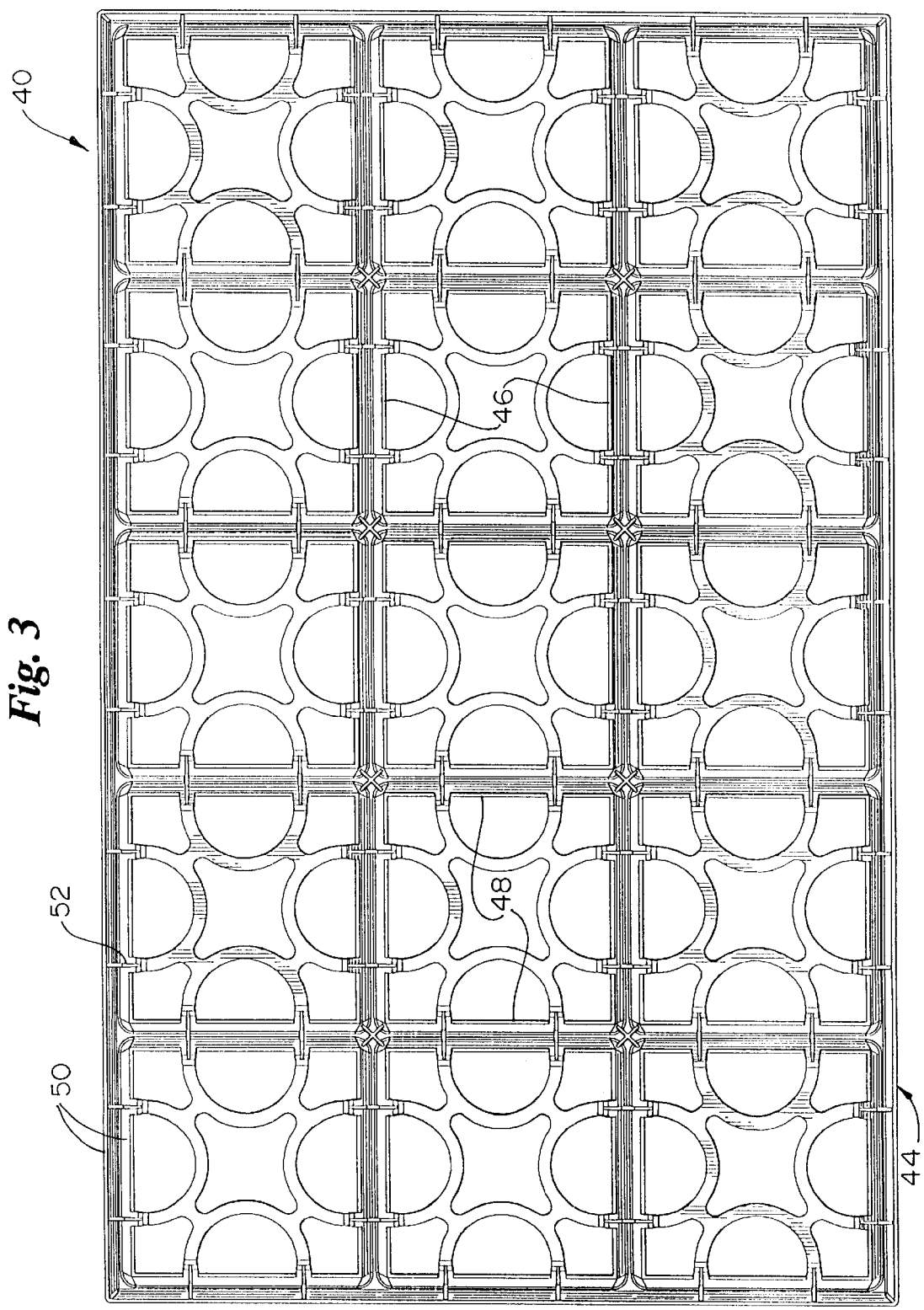
FIG. 3 is a bottom plan view of the pot tray of FIG. 1.
Figure 4:
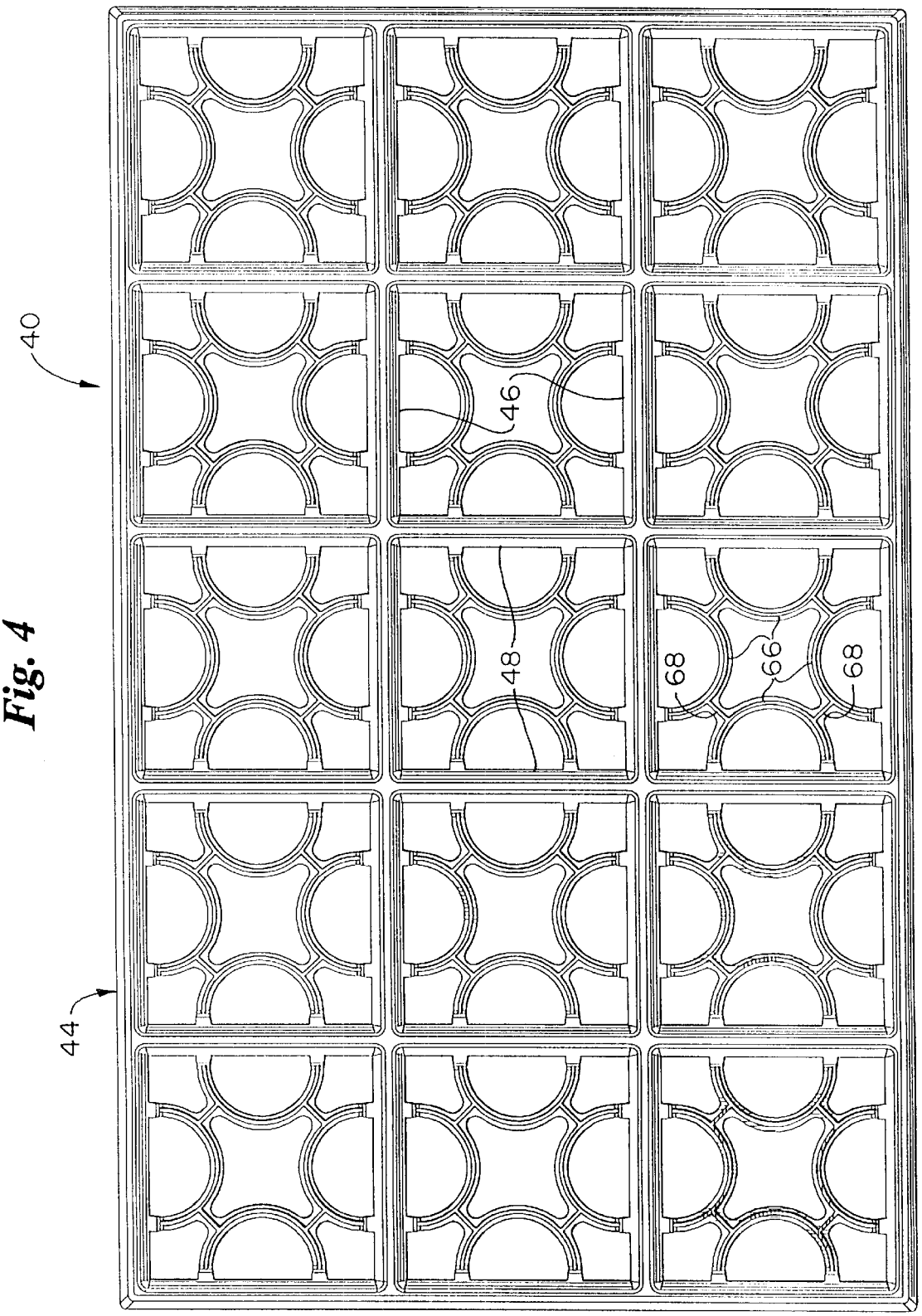
FIG. 4 is a top plan view of the pot tray of FIG. 1.
Figure 5:
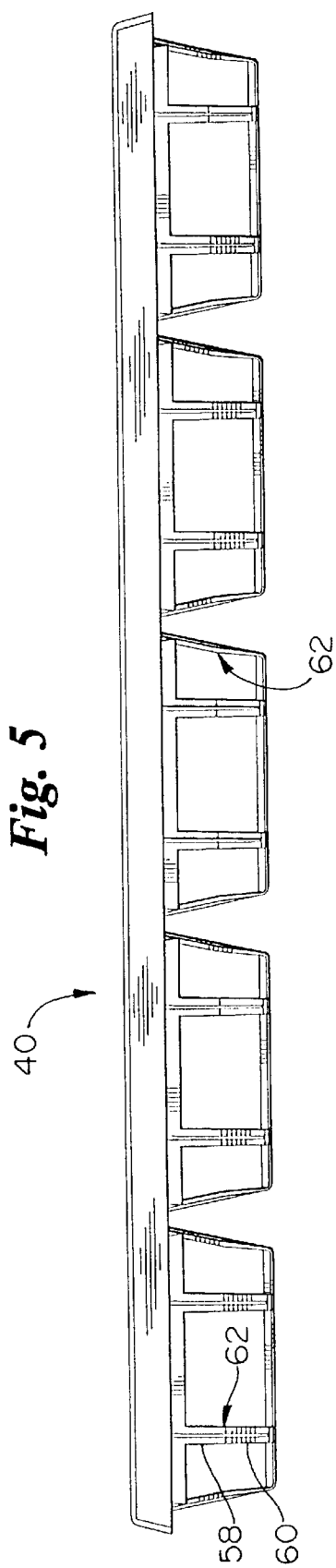
FIG. 5 is a side elevational view of the pot tray of FIG. 1.
Figure 6:
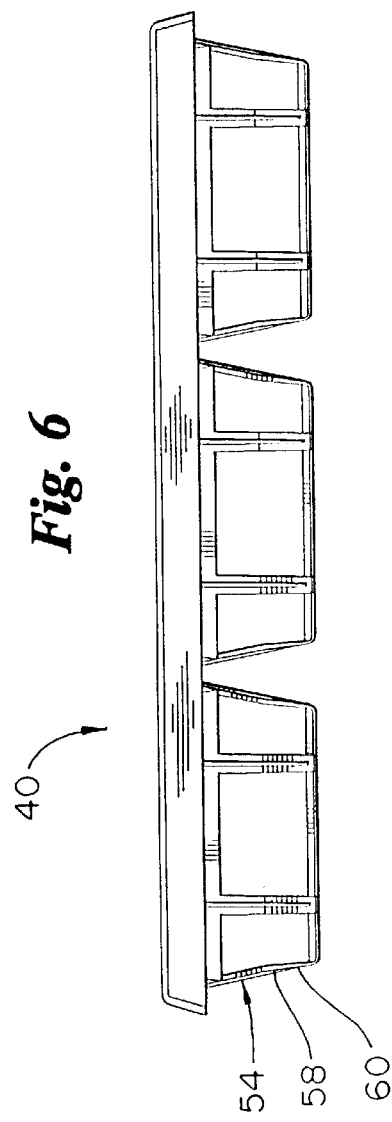
FIG. 6 is a front elevational view of the pot tray of FIG. 1.

Each flat 40 includes a matrix of "cells" 42, with the preferred flat shown in the drawings having cells arranged in a 3-by-5 matrix. Each cell 42 is in the nature of a pocket for holding one pot 20. The flat 40 includes a frame 44 constructed from an XY matrix of column and row frame members (46 and 48, respectively), each of which is substantially "A-shaped," having two sloped substantially planar "legs" 50 that join at the top (via a short horizontal connector that forms the top of the "A") and slope outwardly and downwardly. The preferred included angle between the frame legs 50 is about 30°; so that the preferred angle from the vertical of a given frame leg 50 is about 15°. Frame legs 50 are relatively thin, so that inside the "A" between adjoining legs it is substantially hollow, but ribs 52 are added toward the apex of the "A" for strength. See FIG. 2, for example. The hollow "A" design of the frame renders it nestable with the frames of other like flats 40, so as in the case of the pots 20 a large number of such flats 40 can be compactly stacked for shipping, handling and storage efficiencies.

Extending downwardly and inwardly from the square frame (i.e., the square portion of the overall frame 44 devoted to one particular cell 42) defining the superstructure and the mouth of each cell is what could be termed a "side structure," i.e., a structure for engaging the sides of the pot. In a preferred embodiment, the "side structure" includes a plurality of "struts" 54, two on each side of a given pot. Thus in this preferred embodiment there are eight struts 54 substantially evenly spaced around and extending downwardly and inwardly from the frame 44, or rather the square portion of the frame 44 that forms the superstructure for this particular cell 42. The struts 54 are generally straight and slender, and are also ribbed for strength, there being a rib 56 on the back of each strut 54 (i.e., the side of the strut facing away from the pot).

Each strut 54 includes a top portion 58 connected to the lower edge of the inner leg 50 of the frame 44. In fact, the top portion 58 of the strut is like an extension of the inner frame leg 50, with the front face of the strut top portion 58 being flush with the adjoining frame leg 50 and at substantially the same angle. The rib 56 on the back of the strut 54 continues up into the "A" between the frame legs 50 and eventually joins up with the rib 56 from the strut 54 on the adjacent cell 42 at the inner apex of the "A". This is also where the frame rib 52 is located, and in fact the strut ribs 56 are essentially downward extensions of the frame rib 52, this continuous rib design adding bending and torsional strength to the slender struts and to the flat as a whole.

Each strut 54 also includes a strut bottom portion 60 of roughly equal length to the strut top portion 58. Importantly, the strut bottom portions 60 (or at least the front or inner surfaces of same; i.e., the surfaces that face the pot) are closer to vertical than the front surfaces of the strut top portions 58. The strut top portions 58 join the strut bottom portions 60 at a transition or bend line 62, and this line is preferably positioned at a particular level or height, depending on the design of pot 20 and the degree to which a pair of such pots 20 nest together, or rather the amount of dead space between such nested pots, for reasons that will be discussed below.

Now that the overall structure of the struts 54 have been described in some detail, attention can be directed to the angles of the various portions of the struts 54 relative to the angle formed by the sloping sides of the pot 20, this relationship being important to the functioning of the preferred embodiment of the present invention. Referring in particular to FIG. 10, the sloping sides of the pot 20 form a "pot angle" 64 of about 5°. For reasons that will be discussed below, this is also the "bottom angle" 66 of the inner (i.e., pot facing) surface of the strut bottom portion 60. Finally, the "top angle" 68 of the inner (i.e., pot facing) surface of the strut top portion 58 is preferably larger (relative to vertical) than the bottom angle 66; and in this embodiment the top angle 68 is preferably about 12° degrees from vertical. The top angle 68 is preferably larger than the bottom angle 66 (and thus the pot angle 64), but otherwise it is not necessary that the top angle 68 be any particular number or magnitude.

Figure 8:
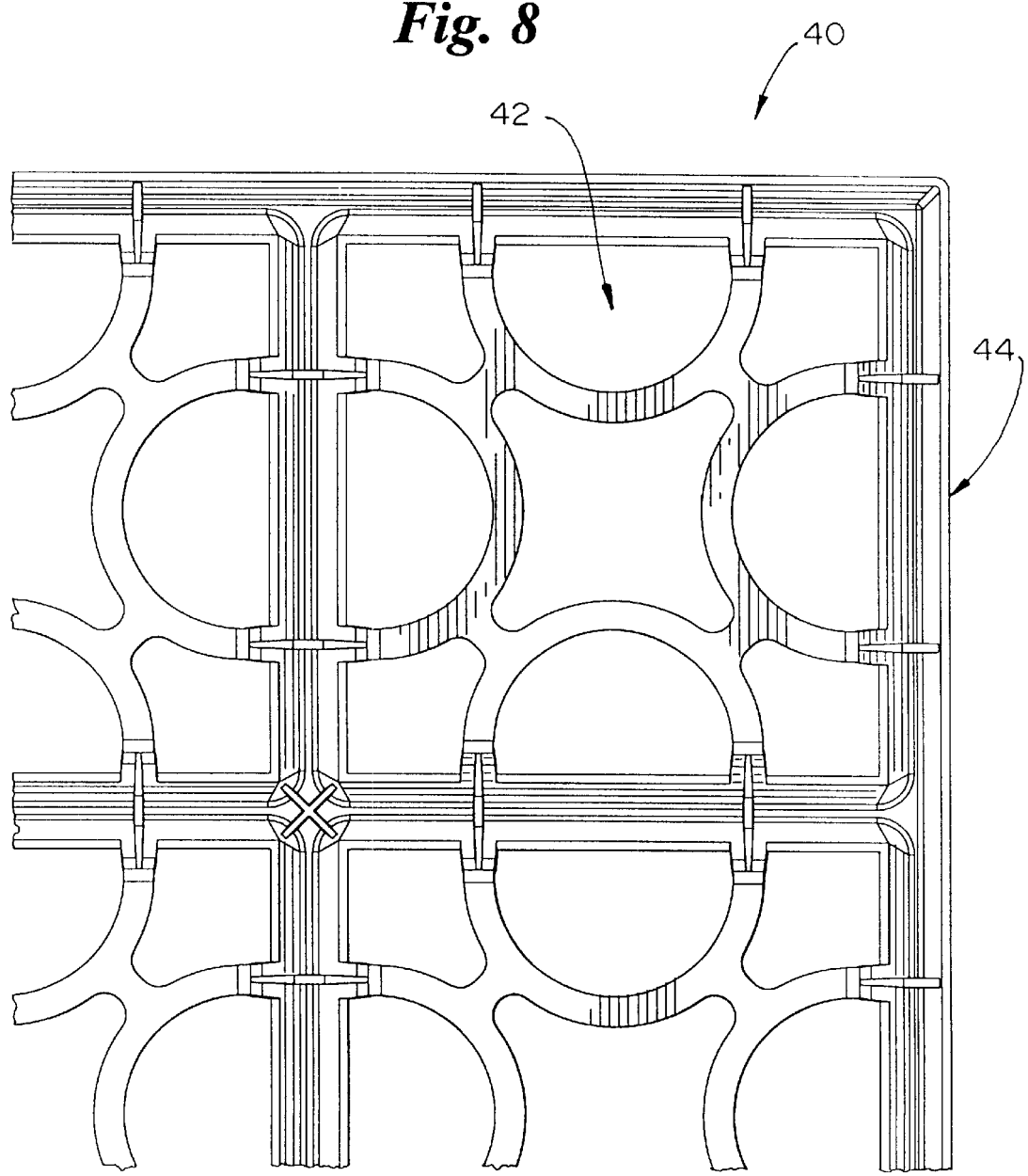
FIG. 8 is an enlarged bottom plan view of a single cell of the pot tray of FIG. 1.
Figure 9:
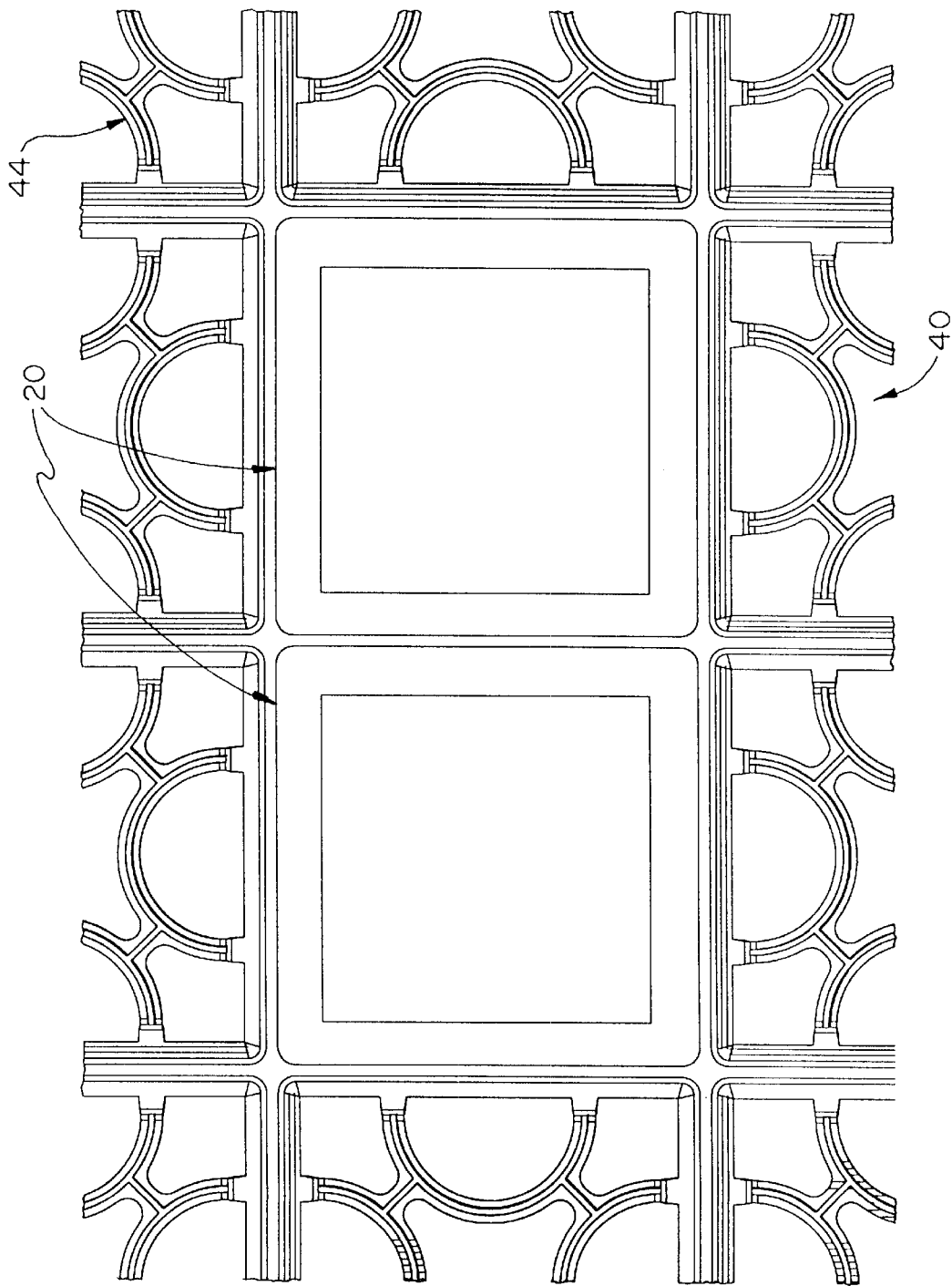
FIG. 9 is an enlarged top plan view of a pair of adjacent cells of the pot tray of FIG. 1, holding a pair of pots.

The struts 54 of a given cell 42 are interconnected at their lower tips by a complex generally planar bottom structure 70 having a plurality of interconnected and outwardly-facing semicircular "spanners" 72 that are centered on each side of a given cell. Each semicircular spanner 72 is connected to adjacent spanners by short connectors 74. Semicircular spanners 72 and their connectors 74 are also ribbed for strength, preferably on their top surfaces. With particular reference to FIG. 8, spanners 72 and connectors 74 are arranged and configured to support the base 26 of the pot 20, but at the same time not to block the drainage holes 34 and slots 36 of the pot 20.

Like pots 20, preferred flat 40 is also preferably made using an injection molding process. This permits the flats to be mass produced at a reasonable cost, and even though thermoformed articles of manufacture are often considered to be somewhat light and fragile, in the case of the preferred flat structure 40 of the present invention the use of box sections (i.e., the "A" cross section of the frame) and extensive ribbing makes for a flat that is light weight but at the same time very strong.

Operation

Now that a preferred structure of the flat 40 has been described, its function and the way in which it works synergistically with the pots 20 to make an efficient, effective pot/flat system can be discussed. As noted above, the front faces of the strut bottom portions 60 are substantially at the same angle to the vertical as the sloping sides 22 of the pot. That is, the "bottom angle" 66 is substantially equal to the "pot angle" 64. Moreover, the pocket formed by the eight struts 54, or rather the eight strut bottom portions 60, is substantially the same size and shape as the bottom portion of the pot, but slightly smaller. This permits the strut bottom portions 60 to frictionally grip the sides 22 of the pot, which bow inwardly slightly due to the fact that the pot walls 22 are quite flexible in this preferred embodiment. Since the eight strut bottom portions 60 within a given cell are arranged and configured to form substantially the same shape as the pot bottom, the pot 20 is firmly and frictionally held in place by the struts 54. The fact that the front faces of the strut bottom portions 60 are at the same or substantially the same angle as the pot walls 22 ensures sufficient surface contact between the struts and the pot walls to securely hold the pot 20 and maximize the stabilizing friction force created on the pot walls. A relatively small but controlled force is thus required to engage or disengage the pot with or from the lower pocket formed by the strut bottom portions 60, but the frictional retaining force is sufficient to prevent the pot(s) 20 from rattling or tumbling over even if the flat 40 is not completely full of pots.

But in addition to adequately retaining a pot within a given cell, the struts 54 of a preferred flat structure 40 are designed to frictionally hold only the outer/lower pot 20b of a stack of two or more nested pots. See FIGS. 7 and 10. This feature takes advantage of the "dead space" 32 between a pair of nested pots 20, as can now be described with particular reference to FIGS.7 and 10. As discussed above, a given strut top portion adjoins its strut bottom portion at a bend line 62. The bend line 62 is where the strut top portion 58 angles away from the pot, so only the strut bottom portions 60 are involved in frictionally gripping the pot. If the bend line 62 is located approximately at the level or height of the base 26 of the inner/upper pot 20a, as shown in FIGS.7 and 10, then even if the walls 22 of the lower/outer pot 20b bend inwardly slightly there will be little if any force transmitted to the walls of the inner/upper pot 20a, and thus the inner/upper pot 20a can be readily removed without disturbing or having to remove the lower/outer pot 20b. This is in contrast to the situation that would be present if a strut did not have the double-angle design of the struts 54 of the preferred flat 40 according to the present invention. That is, if the entire strut had the angle of the bottom strut portions described above, this would tend to cause the walls of the lower/outer pot to bow inwardly and frictionally grip the upper/inner pot(s); or, alternatively, if the entire strut had the angle of the top strut portion, then the walls of the lower/outer pot would not be adequately engaged to frictionally hold the pot in place, especially if that pot were not completely "surrounded" by like pots in a completely full flat.

The feature whereby only the lower pot 20b of a stack of nested pots 20 is gripped is important when initially filling the flat 40 with empty pots, since occasionally a stack of two or more pots is inserted, intentionally or inadvertently, within a given cell 42 of a flat, and it is of course desirable to end up with only a single pot in a given cell 42. And all of this has to be done rapidly and with a minimum of repetitive or wasted motion, given that commercial nurseries and greenhouses need to rapidly fill large numbers of flats in a mass production manner in order to minimize planting costs.

As noted above, depending on the type and shape of pot to be accommodated, the flat can have a variety of configurations. For example, and not by way of limitation, if the pots were round, or rather conical in shape (with a round mouth, a slightly smaller round base, and sloping walls), then the cells within a flat according to the present invention would also have this general shape, with the struts again gripping the lower portion of the pot and the bend or transition lines of the struts being located in such a way as to maximize contact of the strut bottom portions to generate an appropriate amount of stabilizing friction on the lower/outer pot, while at the same time minimizing the gripping force on the inner/upper pot 20a. Thus, the present invention is in no way limited to a particular type or shape of pot.

Preferred embodiments of the invention are described above. Those skilled in the art will recognize that other embodiments are possible within the scope of the invention. Variations and modifications of the various parts and assemblies can certainly be made and still fall within the scope of the invention. Thus, the invention is limited only to the apparatus and method recited in the following claims, and equivalents thereto.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A flat/pot system comprising:
   (a) a plurality of nestable pots, wherein when two such pots are nested together the upper/inner pot extends partially into the lower/outer pot, leaving a dead space therebetween; and
   (b) a flat having a like plurality of interconnected cells for holding the pots, wherein each cell comprises:
   (i) an upper frame; and
   (ii) a side structure depending from the frame, the side structure comprising a lower pot gripping portion, wherein when a pair of nested pots is engaged within one of the cells the pot gripping portion frictionally engages the lower/outer pot substantially in the area of the dead space, so as not to effectively grip the inner/upper pot.

2. The flat/pot system according to claim 1, wherein the pots include perforated bases to permit water drainage and air exchange, and wherein the bottom of each cell of the flat is constructed in a lattice structure that accommodates water drainage and air exchange through the pot bases.

3. The flat/pot system according to claim 1, wherein the side structure further comprises a proximal portion connected to the frame, the proximal and lower pot gripping portions intersecting each other to define knees.

4. The flat/pot system in accordance with claim 3, wherein respective proximal and lower pot gripping portions intersect each other at an obtuse angle.

5. The flat/pot system in accordance with claim 1 further comprising a bottom structure intersecting said lower pot gripping portions at remote ends thereof.

* * * * *